(12) United States Patent
Stroppa et al.

(10) Patent No.: US 9,397,574 B2
(45) Date of Patent: Jul. 19, 2016

(54) CONTROL DEVICE FOR A DC-DC CONVERTER

(75) Inventors: Alberto Stroppa, San Giuliano Milanese (IT); Claudio Spini, Monza (IT); Claudio Adragna, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 327 days.

(21) Appl. No.: 13/990,394

(22) PCT Filed: Dec. 19, 2011

(86) PCT No.: PCT/EP2011/073270
§ 371 (c)(1),
(2), (4) Date: Aug. 27, 2013

(87) PCT Pub. No.: WO2012/084845
PCT Pub. Date: Jun. 28, 2012

(65) Prior Publication Data
US 2013/0329470 A1    Dec. 12, 2013

(30) Foreign Application Priority Data
Dec. 22, 2010 (IT) .............................. MI2010A2347

(51) Int. Cl.
G05F 1/00 (2006.01)
H02M 3/335 (2006.01)
H02M 7/757 (2006.01)
(Continued)

(52) U.S. Cl.
CPC ........ *H02M 3/33507* (2013.01); *H02M 3/3376* (2013.01); *H02M 2001/0032* (2013.01); *Y02B 70/16* (2013.01)

(58) Field of Classification Search
CPC ................................ G05F 1/461; G05F 1/462

USPC ......... 323/266, 268, 270, 273–277, 282, 284,
323/285; 363/17, 19, 21.01, 21.02, 21.05,
363/21.13, 21.18, 39–41, 50, 55–56.05,
363/56.09–56.12, 78, 79
See application file for complete search history.

(56) References Cited

U.S. PATENT DOCUMENTS

| | | | |
|---|---|---|---|
| 4,814,962 A | | 3/1989 | Magalhaes et al. |
| 5,469,349 A | * | 11/1995 | Marinus ............ H02M 3/33507 363/21.05 |
| 5,770,940 A | * | 6/1998 | Goder ..................... G05F 1/565 323/282 |

(Continued)

OTHER PUBLICATIONS

ST L6591, *PWM Controller for ZVS Half-Bridge*, Doc ID 14281 Rev 4, STMicroelectronics, 2009, 32 pages.
Miftakhutdinov, Rais, *Power Saving Control Strategies and Their Implementation in DC/DC Converter for Data and Telecommunication Power Supply*, Texas Instruments, Inc. Power Supply Control Group, 2010 IEEE, 7 pages.

(Continued)

*Primary Examiner* — Adolf Berhane
*Assistant Examiner* — Gary Nash
(74) *Attorney, Agent, or Firm* — Seed IP Law Group PLLC

(57) ABSTRACT

A control device controls a switching circuit of a DC-DC converter. The switching circuit includes a half-bridge with at least first and second switches connected between an input voltage and a reference voltage. The converter comprises a transformer with a primary coupled with the center point of the half-bridge and a secondary coupled with a load. The control device comprises an error detector configured to determine an error signal representing a difference between a first signal representative of the voltage across the load and a first reference signal and a frequency controller configured to increase the switching frequency of the half-bridge when the error signal is kept below a second signal.

26 Claims, 3 Drawing Sheets

(51) Int. Cl.
*H02M 3/337* (2006.01)
*H02M 1/00* (2006.01)

(56) References Cited

U.S. PATENT DOCUMENTS

| | | | |
|---|---|---|---|
| 5,808,879 A | 9/1998 | Liu et al. | |
| 5,959,850 A | 9/1999 | Lim | |
| 6,292,376 B1* | 9/2001 | Kato | 363/21.09 |
| 6,366,070 B1* | 4/2002 | Cooke | H02M 3/1588 323/222 |
| 6,728,117 B2* | 4/2004 | Schemmann et al. | 363/21.12 |
| 6,826,063 B2* | 11/2004 | Ichikawa et al. | 363/41 |
| 6,950,318 B2 | 9/2005 | Liang et al. | |
| 2005/0057238 A1* | 3/2005 | Yoshida | 323/282 |
| 2006/0043953 A1* | 3/2006 | Xu | H02M 3/156 323/282 |
| 2009/0190377 A1* | 7/2009 | Wang | H02M 3/156 363/21.1 |
| 2009/0207635 A1 | 8/2009 | Elferich | |
| 2009/0262562 A1* | 10/2009 | Yang | 363/84 |
| 2009/0284237 A1* | 11/2009 | Kitagawa | H02M 3/156 323/282 |
| 2009/0284991 A1* | 11/2009 | Nishikawa | 363/21.02 |
| 2009/0302820 A1* | 12/2009 | Shimizu | H02M 3/156 323/285 |
| 2009/0322299 A1* | 12/2009 | Michishita et al. | 323/282 |

OTHER PUBLICATIONS

Wu, Li-Ming and Pong, Chen-Yin, *A Half Bridge Flyback Converter with ZVS and ZCS Operations*, The 7th International Conference on Power Electronics, Oct. 22-26, 2007, EXCO, Daegu, Korea, 2008, IEEE, 7 pages.
L5991—datasheet, "Primary Controller With Standby," STMicroelectronics, 23 pgs., Aug. 2001.
L6565—datasheet, "Quasi-Resonant SMPS Controller," STMicroelectronics, 17 pgs., Jan. 2003.
L6668—datasheet, "Smart Primary Controller," STMicroelectronics, 23 pgs., Jan. 2006.
L6566BH—datasheet, "Multimode Controller for SMPS," STMicroelectronics, Apr. 2012.
Chen et al., "Characterization of Asymmetrical Half Bridge Flyback Converter," IEEE 33rd Annual Power Electronics Specialists Conference, vol. 2, pp. 921-926, 2002.
Chen et al., "Analysis and design of asymmetrical half bridge flyback converter," IEE Proc.-Electr. Power Appl., 149(6):433-440, Nov. 2002.
Seo et al., "Asymmetrical PWM Flyback Converter," IEEE 31st Annual Power Electronics Specialists Conference, vol. 2, pp. 848-852, Jun. 18-23, 2000.
Xu, X., "An Asymmetrical Half Bridge Flyback Converter with Zero-Voltage and Zero-Current Switching," The 30th Annual Conference of the IEEE Industrial Electronics Society, Busan, Korea, pp. 767-772, Nov. 2-6, 2004.

* cited by examiner

CONTROL DEVICE FOR A DC-DC CONVERTER

BACKGROUND

1. Technical Field

The present disclosure relates to a control device for a DC-DC converter, in particular for a flyback converter.

2. Description of the Related Art

It is important for many circuit applications for converters to obtain an excellent performance during the operation at average or maximum load and also a good performance during the operation with low load, also less than a watt.

Among the various circuit topologies implementable capable of meeting the aforesaid minimum efficiency limits at average or maximum load, the resonant topologies or soft-switching of half-bridge type are very common, like the converter with flyback-type operation shown in FIG. 1, which comprises two electronic switches S1, S2 arranged in series, connected between the DC supply voltage Vin and the ground GND.

The load is generally connected by means of a transformer 10 having the purpose of isolating the output ground from the input and moreover of permitting a control between the output voltage Vout and the input voltage Vin. The converter comprises a capacitor Cr and an inductance L1 arranged in series to the transformer 10 and a further circuit block, comprising a diode D1 and a capacitor Cout, interposed between the transformer 10 and the load, adapted to rectify and filter the voltage from the secondary of the transformer to make it compatible with the features required by the load.

The topologies of half-bridge soft-switching converters comprise a push-pull control of the electronic switches S1-S2, with a short delay period interposed between the turn off of one switch and the turn on of the other one, called dead time, during which there is no conduction of both. When the switch S1 is turned on, there is the temporary connection of the transformer to the input voltage Vin with the consequent storage of part of the energy in the magnetization inductance Lm of the transformer by means of the circulation of a current I1. During the successive turn off step of the same switch S1 and consequent turn on of the other switch S2, there is the closing of a loop comprising the transformer 10, the capacitor Cr and the inductance L1 and a resonance may occur between the elements; there is a circulation of current I2 in said step. The transfer of energy to the load may occur during the turn on step of the switch S1, i.e., during the storing step of the energy, and in this case a forward-type converter will be obtained, or during the turn on step of the switch S2, thus obtaining flyback converter like the one shown in FIG. 1.

The control type of these typologies is generally at fixed or variable frequency and variable duty cycle. The peculiarity of the switching during turn on of the switch elements having zero voltage (so-called ZVS operation) also permits to obtain very high circuit performances at full load. However, by decreasing the load to a small fraction of the maximum value, the overall efficiency of the circuit decreases significantly due to the predominant leakages of the circuit switching elements which are directly proportional to the operating frequency of the circuit.

Various techniques have been implemented to decrease such leakages and to try to minimize them; most of such techniques are about decreasing the operating frequency of the circuit and are called "frequency foldback" or "frequency shifting".

With such a technique the operating frequency is decreased as the circuit load decreases, thus contributing to decreasing the leakages and hence to increasing the efficiency at decreased loads. Such a decrease may occur both suddenly, i.e., at a certain threshold the circuit is made to operate at a lower frequency, or the frequency may be decreased continuously, proportionally with the value of the load.

A highly widespread type of control for power converters is called "current mode". In this type of control, the instantaneous current flowing in the circuit during the step in which the generator supplies power to the circuit is compared with the output signal of an error amplifier adapted to amplify the error between a voltage proportional to the output voltage Vout and a reference voltage Vref. The intersection of the output signal of the error amplifier and of the instantaneous current determines the duration of the turn on time of the switch S1 which connects the supply voltage Vin to the circuit transferring the power to the load. The output signal of the error amplifier has an amplitude equal to the amplitude of the current signal for the circuit gain; given that the current flowing through the circuit during the turn on step of the switch S1 is proportional to the input power, the result is that the output signal of the error amplifier is proportional to the input power of the converter itself and therefore, without considering the variation due to the efficiency of the circuit, to the output power supplied to the load, without depending on the input voltage.

In the half-bridge ZVS flyback in FIG. 1, the switches S1 and S2 are push-pull controlled. In this case too, during the turn on period of the switch S1 there is an accumulation of energy in the magnetization inductance Lm and in the dispersion inductance L1 of the transformer. During the successive turn off step of the switch S1, the current is not cancelled but will flow through the switch S2 again which S2 will be turned on during such a step. During such a time period the transfer of part of the accumulated energy to the secondary and thus to the load will be obtained, while part of the energy not transferred will result in a re-circulating current through the primary. Hence the current Isense flowing through the primary, detected by the sense resistance Rs, will have a waveform given by the average current supplied at the output by means of the mutual inductance, to which a ramp overlaps due to the current flowing through the magnetization inductance Lm of the transformer. Hence, due to these two components, the result will be, also under conditions of zero load, that the signal detected on the sense resistance Rs will have a minimum amplitude depending on the current circulating through the magnetization inductance Lm of the transformer.

For such a reason the output of the error amplifier in a current mode control system under conditions of low load is no longer proportional to the load itself due to the current circulating through the magnetization inductance of the transformer. Hence there will be a minimum voltage at the output of the error amplifier which will depend on the parameters of the power circuit, i.e., information proportional to the load at the output of the error amplifier is not available.

Furthermore, the current circulating the magnetization inductance of the transformer prevents using the technique of decreasing the switching frequency mentioned above. Indeed, as the feedback keeps the duty cycle constant, a decrease of the frequency would determine an increase of the charge time of the magnetization inductance. Thus an increase of the primary current peak and some related leakages would be obtained and the output of the error amplifier would increase. Thereby each decrease of the frequency proportional to the output of the error amplifier (as is commonly done in various devices) would lead to a consequent re-increase of the switching frequency. Increasing the switching frequency would re-lower the output level of the error amplifier which would be interpreted by the control circuitry as a low load operating condition. This would generate a condition of operating instability for the circuit.

BRIEF SUMMARY

One embodiment of the present disclosure is a control device for a DC-DC converter, in particular a flyback converter, which overcomes the aforesaid drawbacks.

One embodiment of the disclosure a control device of a switching circuit for a DC-DC converter, said switching circuit comprising at least a half-bridge with at least a first and a second switch which is connected between an input voltage and a reference voltage, said converter comprising a transformer with a primary coupled with the center point of said half-bridge and a secondary coupled with a load, said control device comprising first means adapted to determine the error signal between a first signal representative of the voltage across the load and a first reference signal, characterized in that it comprises second means configured to increase the switching frequency of the half-bridge when the error signal is kept below a second signal.

Thanks to the present disclosure it is possible to provide a control device for a DC-DC converter which decreases the conduction leakages.

Preferably the control device comprises means adapted to implement the "burst mode" method so as to decrease also the leakages caused by the switching.

BRIEF DESCRIPTION OF THE SEVERAL VIEWS OF THE DRAWINGS

The features and advantages of the present disclosure will become apparent from the following detailed description of practical embodiments thereof, shown by way of non-limiting examples in the accompanying drawings, in which.

DETAILED DESCRIPTION

Figure 1:
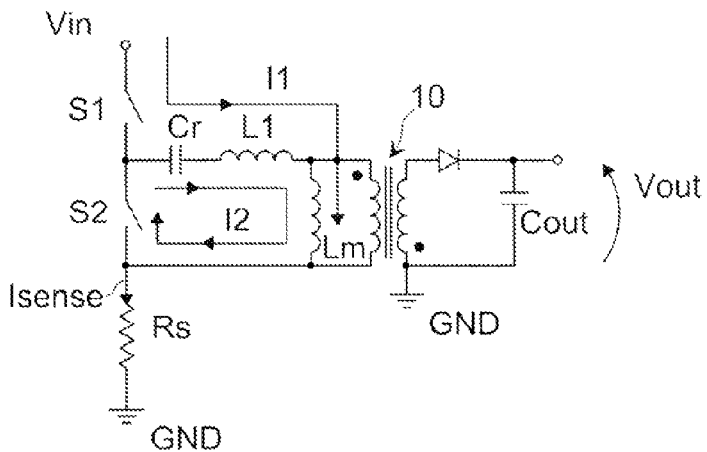
FIG. 1 is a schematic circuit of a flyback converter in accordance with the known art.
Figure 2:
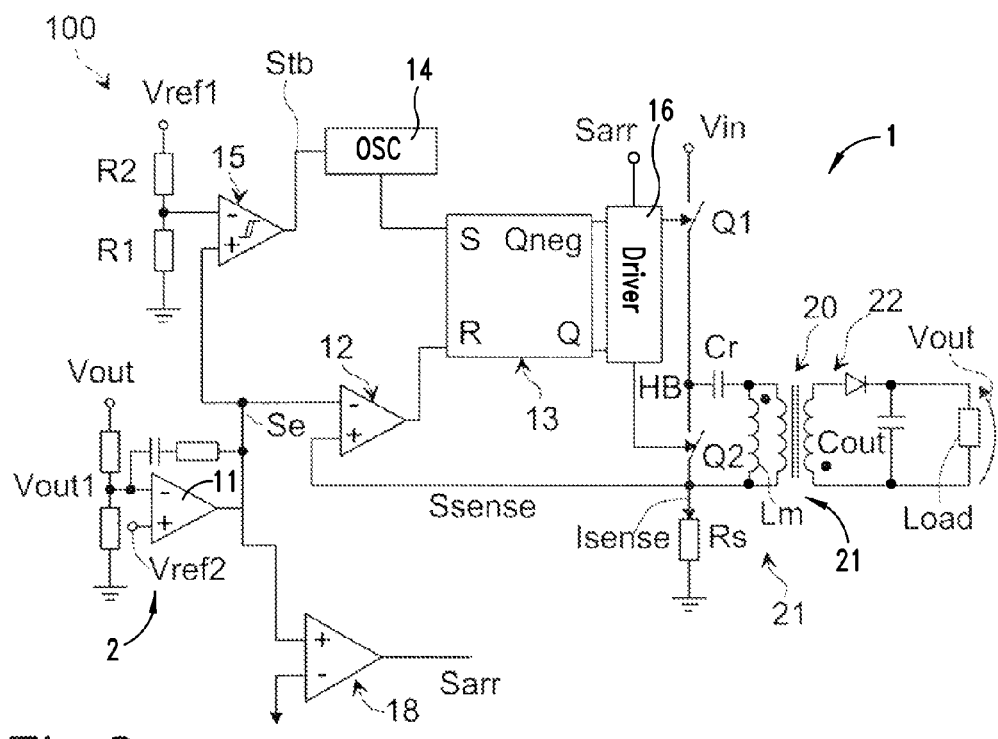
FIG. 2 is a schematic circuit of a control device for a flyback converter in accordance with a first embodiment of the present disclosure.

FIG. 2 shows a control device 100 for a DC-DC converter, in particular for a flyback converter 1, in accordance with a first embodiment of the present disclosure. The control device 100 is adapted to control the switching circuit Q1, Q2 of the flyback converter 1. The switching circuit comprises at least a half-bridge of first Q1 and second Q2 switches, preferably transistors, connected between an input voltage Vin and a reference voltage GND. The converter comprises a transformer 20 with a primary 21 coupled with the center point HB of said half-bridge and a secondary 22 coupled with a load LOAD. The control device 100 is preferably integrated in a chip of semiconductor material.

The control device 100 comprises a comparator 15 configured to increase the switching frequency of said half-bridge Q1, Q2 in response to detecting that the error voltage Se is below a second voltage V1. The voltage V1 is obtained at a midpoint of another voltage divider having resistors R1, R2 coupled between a reference voltage terminal Vref1. The comparator 15 is configured to compare the voltage Se with the voltage V1=Vref1*R1/(R1+R2) and to send an output signal Stb to control the frequency of an oscillator 14 adapted to provide a set signal to a set input S of the flip-flop 13. When the comparator 15 emits the signal Stb the oscillator increases its oscillation frequency for the entire duration of the signal Stb thus increasing the switching frequency of the half-bridge Q1, Q2 via the flip-flop 13 and the driver circuit 16.

The comparator 12 is configured to deactivate, via the flip-flop 13 and a switch driver 16, said first transistor Q1 when the error voltage Se equals a voltage Ssense representative of the current signal Isense flowing on the primary 21 of the transformer 20; in particular the voltage at the terminals of a sense resistance Rs through which the current Isense flows.

The control device 100 comprises a comparator 15 configured to increase the switching frequency of said half-bridge Q1, Q2 in response to detecting that the error voltage Se is below a second voltage V1. The voltage V1 is obtained at a midpoint of another voltage divider having resistors R1, R2 coupled between a reference voltage terminal Vref1. The comparator 15 is configured to compare the voltage Se with the voltage V1=Vref1*R1/(R1+R2) and to send an output signal Stb to control the frequency of an oscillator 14 adapted to provide a set signal to a set input S of the flip-flop 13. When the comparator 15 emits the signal Stb the oscillator increases its oscillation frequency for the entire duration of the signal Stb thus increasing the switching frequency of the half-bridge Q1, Q2 via the flip-flop 13 and the driver circuit 16.

Thereby the conduction leakages are minimized while the switching leakages, which typically are less than the conduction leakages are increased.

Preferably the control device 100 comprises a further comparator 18 adapted to compare the signal Se with a reference voltage Vref3 and to emit a signal Sarr if, and as long as the signal Se is less than Vref3. The signal Sarr is at the input to the driver 16 having at the input the outputs Q and Qneg of the flip-flop 13; the presence of the signal Sarr allows the driver 16 to control the deactivation of the half-bridge Q1, Q2.

Thereby the circuit operates in burst mode: i.e., the switching cycles are not continuous but depending on the output load, the control circuit controls the deactivation of the half-bridge Q1, Q2, i.e., the turn off of the transistors Q1 and Q2 for a certain interval of time. The operation resumes as soon as the controlled value, i.e., the signal Se, equals or exceeds the value Vref3. Thereby the average frequency of the switchings, equivalent to a continuous operation of the circuit, is decreased with the aforementioned advantages.

Thus the device in accordance with the disclosure may automatically activate and deactivate the burst mode packet operating modality (burst mode or pulse skipping). Hence a point is established above which the circuit should operate regularly and below which operating the circuit in burst mode is wanted. By detecting this point by means of a detection circuit and having a circuitry operating on the oscillator of the control device, a higher switching frequency of the circuit may be induced. The higher switching frequency of the circuit results in the magnetization current peak decreasing and therefore the output signal Se of the error amplifier 11 also decreases. Thus a positive feedback will be established between these parameters which will bring the output of the error amplifier to low saturate, and i.e., automatically activate the burst mode operating modality with the advantages described above. If the load increases, this will be detected by the error amplifier whose output Se will go high, thus deactivating the burst mode operating modality and also deactivating the circuitry which increased the switching frequency.

Figure 3:
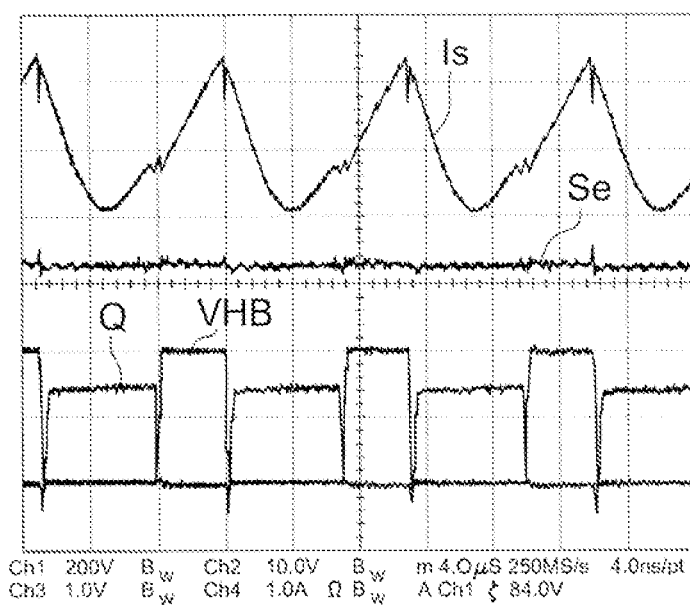
FIGS. 3 and 4 show time diagrams of signals in play in the circuit in FIG. 2 in the case of regular operation (FIG. 3) and burst mode operation (FIG. 4)
Figure 4:
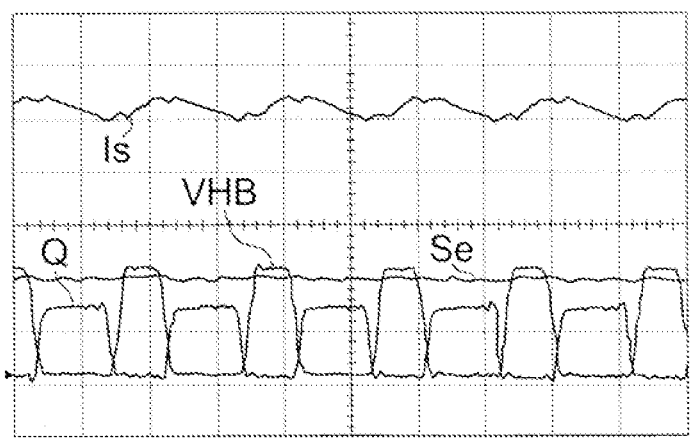

Instead, certain wave forms relating to the operation of the circuit in FIG. 2 are shown in FIGS. 3 and 4. The figures indicate the time diagrams of the signals Is (the current circulating in the transformer 20 and in the capacitor Cr), of the signal Q, of the signal Se and of the signal VHB, i.e., the voltage on the center point HB in the case of operation with nominal load (FIG. 3) and in the case of burst mode operation (FIG. 4).

Figure 5:
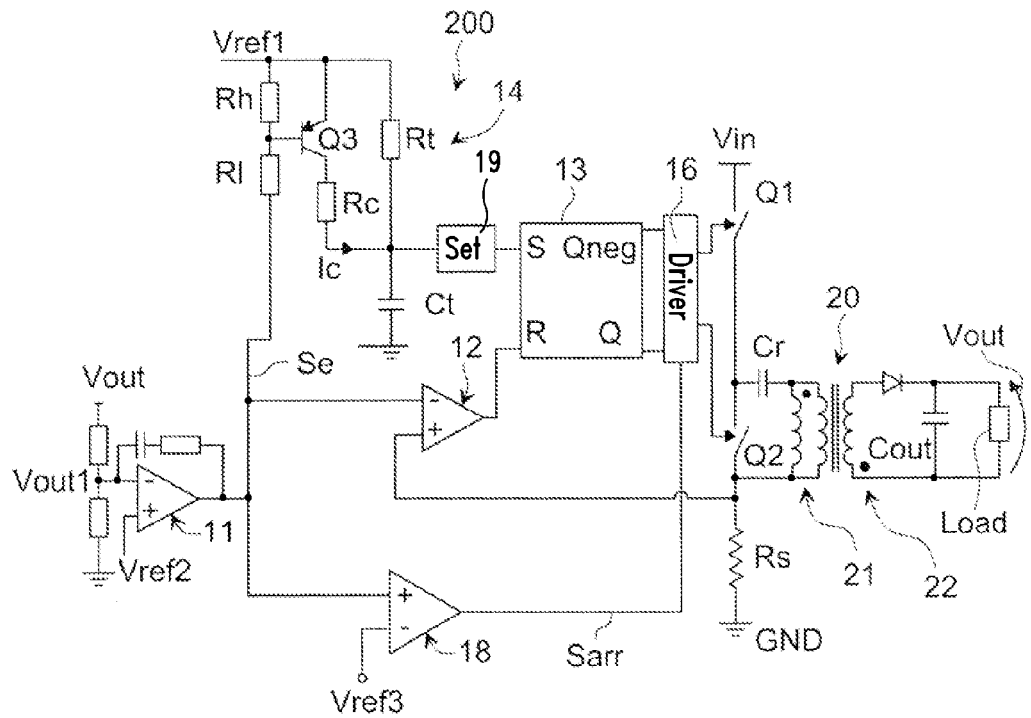
FIG. 5 is a schematic circuit of a control device for a flyback converter in accordance with a second embodiment of the present disclosure.

FIG. 5 shows a control device 200 for a DC-DC converter, in particular for a flyback converter, in accordance with a second embodiment of the present disclosure. The device 200 differs from the device 100 for the different realization of the components 15 and 14 of the device 100 in FIG. 2. The series of two resistances R1 and Rh is included between the voltage Vref1 and the signal Se at the output from the error amplifier 11; the common point of the resistances R1 and Rh is connected to the base terminal of a pnp bipolar transistor Q3 having the emitter terminal connected to the voltage Vref1 and the collector terminal connected to a capacitor Ct by the resistance Rc. A resistance Rt is connected between the voltage Vref1 and the capacitor Ct having the other terminal connected to ground GND. When the signal Se decreases the transistor Q3 begins conducting by emitting a current Ic on the capacitor Ct so as to increase the frequency of the oscillator 14 comprising the capacitor Ct and resistance Rt; the voltage signal at the terminals of the capacitor Ct is sent to a set circuit 19 adapted to provide a set signal to the set input S of the flip-flop 13.

The circuit in FIG. 5 may be integrated in a chip of semiconductor material or may be performed with discrete components.

Figure 6:
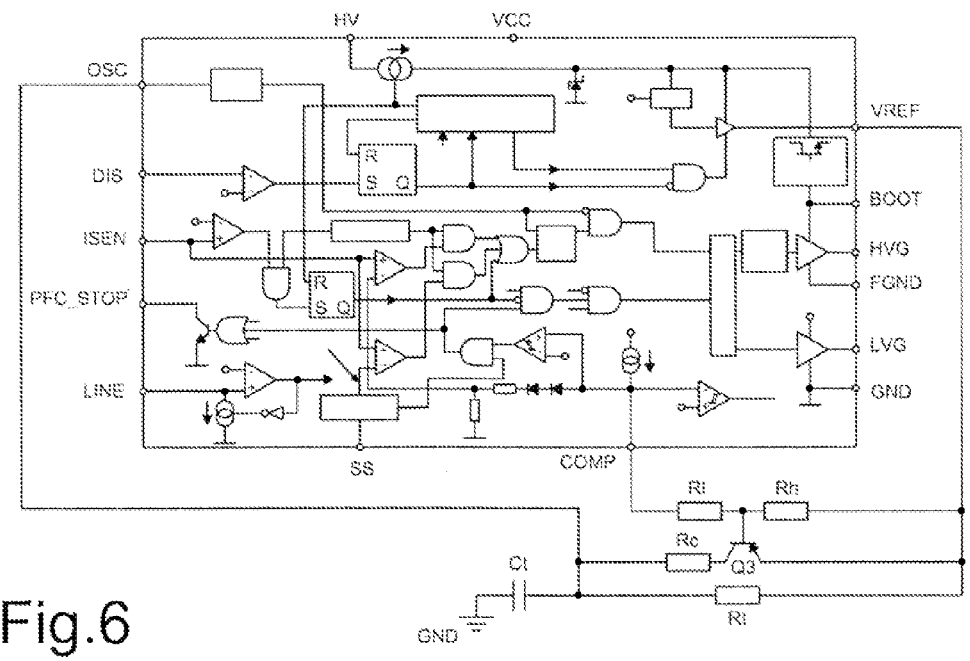
FIG. 6 shows the device in FIG. 5 which comprises the control device L6591 by STMicroelectronics.

FIG. 6 shows a circuit implementation of the innovative part of the device in FIG. 5, applied to a known integrated control circuit, i.e., the controller L6591 by STMicroelectronics known from the data sheet "PWM controller for ZVS half-bridge" of May 2009. The series of two resistances R1 and Rh is included between the pin VREF and the pin COMP in output from the error amplifier 11; the common point of the resistances R1 and Rh is connected to the base terminal of a bipolar transistor pnp Q3 having the emitter terminal connected to the pin VREF and the collector terminal connected to a capacitor Ct by means of the resistance Rc and to the pin OSC. A resistance Rt is connected between the pin VREF and the capacitor Ct having the other terminal connected to ground GND.

Preferably the control device 100, 200 is configured to drive the switching circuit Q1, Q2 using Pulse Width Modulation (PWM).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a switching circuit of a DC-DC converter, said control device comprising:
an error detector configured to provide an error signal based on a difference between a first signal, representative of a load voltage, and a first reference signal;
a frequency controller configured to increase a switching frequency of the switching circuit in response to detecting that the error signal is below a first threshold; and
a sense comparator configured to deactivate the switching circuit in response to detecting that the error signal decreases below a second threshold.

2. The device according to claim 1, wherein said sense comparator is configured to keep said switching circuit deactivated for a number of switching cycles substantially equal to a period of time during which the error signal remains below the second threshold.

3. The device according to claim 1, further comprising a comparator configured to compare said error signal with a signal representative of a current through a primary coil of a transformer of the DC-DC converter and to control opening of one of two switches of a half-bridge of the switching circuit as a function of said comparison.

4. The device according to claim 1, further comprising an oscillator configured to provide an oscillator signal for controlling the switching frequency of a half-bridge of the switching circuit, wherein the frequency controller includes and a comparator configured to cause the oscillator to increase an oscillation frequency of the oscillator signal as a function of a comparison of the error signal with the first threshold.

5. The device according to claim 1, wherein said frequency controller includes a capacitor configured to control the switching frequency of a half-bridge, and a transistor configured to supply said capacitor with a current having a value that increases or decreases in response to an increased or decreased difference between the first reference signal and said error signal.

6. A DC-DC switching converter comprising:
a switching circuit that includes a half-bridge with first and second switches coupled between first and second supply terminals;
a transformer with a primary coil coupled with a center point of said half-bridge and a secondary coil configured to be coupled with a load; and
a control device that includes:
an error detector configured to provide an error signal based on a difference between a first signal, representative of a load voltage, and a first reference signal;
a frequency controller configured to increase a switching frequency of the switching circuit in response to detecting that the error signal is below a first threshold; and
a sense comparator configured to deactivate the switching circuit in response to detecting that the error signal decreases below a second threshold.

7. The converter according to claim 6, wherein said first and second switches are ZVS switches.

8. The converter according to claim 6, wherein the transformer and half-bridge are coupled to one another in a flyback arrangement and the control device is configured to drive the half-bridge using pulse width modulation.

9. The converter according to claim 6, wherein said sense comparator is configured to keep said switching circuit deactivated for a number of switching cycles substantially equal to a period of time during which the error signal remains below the second threshold.

10. The converter according to claim 6, wherein the control device includes a comparator configured to compare said error signal with a signal representative of a current through a primary coil of a transformer of the DC-DC switching converter and to control opening of one of the first and second switches of the half-bridge of the switching circuit as a function of said comparison.

11. The converter according to claim 6, wherein the control device includes an oscillator configured to provide an oscillator signal for controlling the switching frequency of the half-bridge, wherein the frequency controller includes a comparator configured to cause the oscillator to increase an oscillation frequency of the oscillator signal as a function of a comparison of the error signal with the first threshold.

12. The converter according to claim 6, wherein said frequency controller includes a capacitor configured to control the switching frequency of the half-bridge, and a transistor configured to supply said capacitor with a current having a value that increases or decreases in response to an increased or decreased difference between the first reference signal and said error signal.

13. A method of controlling DC-DC switching converter, the method comprising:
providing an error signal based on a difference between a first signal, representative of a load voltage, and a first reference signal;
increasing a switching frequency of a switching circuit of the DC-DC switching converter in response to detecting that the error signal is below a first threshold; and
deactivating the switching circuit in response to detecting that the error signal decreases below a second threshold.

14. The method according to claim 13, comprising keeping said switching circuit deactivated for a number of switching cycles substantially equal to a period of time during which the error signal remains below the second threshold.

15. The method according to claim 13, comprising comparing said error signal with a signal representative of a current through a primary coil of a transformer of the DC-DC switching converter and controlling opening of one of two switches of a half-bridge of the switching circuit as a function of said comparing.

16. The method according to claim 13, comprising:
providing an oscillator signal for controlling a switching frequency of a half-bridge of the switching circuit; and
causing the oscillator to increase an oscillation frequency of the oscillator signal as a function of a comparison of the error signal with the first threshold.

17. A control device for controlling a switching circuit of a DC-DC converter, said control device comprising:
an error detector configured to provide an error signal based on a difference between a first signal, representative of a load voltage, and a first reference signal;
a frequency controller configured to increase a switching frequency of the switching circuit in response to detecting that the error signal is below a first threshold, wherein the frequency controller includes a capacitor configured to control the switching frequency of a half-bridge, and a transistor configured to supply the capacitor with a current having a value that increases or decreases in response to an increased or decreased difference between the first reference signal and said error signal.

18. The device according to claim 17, further comprising a comparator configured to compare said error signal with a signal representative of a current through a primary coil of a transformer of the DC-DC converter and to control opening of one of two switches of the half-bridge of the switching circuit as a function of said comparison.

19. A device according to claim 17, further comprising an oscillator configured to provide an oscillator signal for controlling the switching frequency of the half-bridge of the switching circuit, wherein the frequency controller includes and a comparator configured to cause the oscillator to increase an oscillation frequency of the oscillator signal as a function of a comparison of the error signal with the first threshold.

20. A DC-DC switching converter comprising:
a switching circuit that includes a half-bridge with first and second switches coupled between first and second supply terminals;
a transformer with a primary coil coupled with a center point of said half-bridge and a secondary coil configured to be coupled with a load; and
a control device that includes:
an error detector configured to provide an error signal based on a difference between a first signal, representative of a load voltage, and a first reference signal; and
a frequency controller configured to increase a switching frequency of the switching circuit in response to detecting that the error signal is below a first threshold, wherein the frequency controller includes a capacitor configured to control the switching frequency of the half-bridge, and a transistor configured to supply said capacitor with a current having a value that increases or decreases in response to an increased or decreased difference between the first reference signal and said error signal.

21. The converter according to claim 20, wherein said first and second switches are ZVS switches.

22. The converter according to claim 20, wherein the transformer and half-bridge are coupled to one another in a flyback arrangement and the control device is configured to drive the half-bridge using pulse width modulation.

23. The converter according to claim 20, wherein the control device includes an oscillator configured to provide an oscillator signal for controlling the switching frequency of the half-bridge, wherein the frequency controller includes a comparator configured to cause the oscillator to increase an oscillation frequency of the oscillator signal as a function of a comparison of the error signal with the first threshold.

24. A method of controlling DC-DC switching converter, the method comprising:
providing an error signal based on a difference between a first signal, representative of a load voltage, and a first reference signal;
increasing, by a frequency controller, a switching frequency of a switching circuit of the DC-DC switching converter in response to detecting that the error signal is below a first threshold;
controlling, by a capacitor of the frequency controller, the switching frequency of a half-bridge; and
supplying, by a transistor of the frequency controller, the capacitor with a current having a value that increases or decreases in response to an increased or decreased difference between the first reference signal and the error signal.

25. The method according to claim 24, comprising comparing said error signal with a signal representative of a current through a primary coil of a transformer of the DC-DC converter and controlling opening of one of two switches of a half-bridge of the switching circuit as a function of said comparing.

26. A method according to claim 24, comprising:
providing an oscillator signal for controlling a switching frequency of a half-bridge of the switching circuit; and causing the oscillator to increase an oscillation frequency of the oscillator signal as a function of a comparison of the error signal with the first threshold.

* * * * *